US007612910B2

(12) United States Patent
Oki

(10) Patent No.: US 7,612,910 B2
(45) Date of Patent: Nov. 3, 2009

(54) INFORMATION PROCESSING APPARATUS, INFORMATION PROCESSING SYSTEM, INFORMATION OUTPUT CONTROL METHOD, STORAGE MEDIUM AND PROGRAM

(75) Inventor: Joji Oki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 921 days.

(21) Appl. No.: 10/422,732

(22) Filed: Apr. 25, 2003

(65) Prior Publication Data

US 2003/0202196 A1 Oct. 30, 2003

(30) Foreign Application Priority Data

Apr. 30, 2002 (JP) ............................ 2002-129082

(51) Int. Cl.
*H04N 1/60* (2006.01)
*G06K 9/00* (2006.01)

(52) U.S. Cl. .......................... 358/1.9; 358/2.1; 358/1.1; 358/1.13; 358/1.15; 358/1.18; 382/162; 382/163; 382/276; 382/290; 382/174; 345/418; 345/549; 345/582; 345/583; 345/689

(58) Field of Classification Search .................. 358/1.9, 358/2.1, 515, 517, 518, 529, 1.1, 1.13, 1.14, 358/1.15, 1.18, 3.06, 3.26; 382/162-167, 382/224, 240, 276, 290, 292, 137, 174, 177, 382/178, 183, 185, 198, 200; 345/418, 549, 345/582, 583, 689, 552, 619, 625, 634, 656, 345/667, 682, 2.2
See application file for complete search history.

(56) References Cited

U.S. PATENT DOCUMENTS

| | | | | |
|---|---|---|---|---|
| 5,638,498 A * | 6/1997 | Tyler et al. | ................. | 358/1.18 |
| 5,812,169 A * | 9/1998 | Tai et al. | ...................... | 347/110 |
| 5,828,815 A * | 10/1998 | Herregods et al. | ........... | 358/1.9 |
| 6,057,866 A * | 5/2000 | Haneda et al. | .............. | 347/118 |
| 6,271,937 B1 * | 8/2001 | Zuber | ......................... | 358/1.9 |
| 6,324,356 B1 * | 11/2001 | Inoue | .......................... | 399/39 |
| 6,616,530 B2 * | 9/2003 | Pearce et al. | .................. | 463/17 |
| 6,751,356 B2 * | 6/2004 | Oki | ............................ | 382/240 |
| 6,865,290 B2 * | 3/2005 | Kohchi | ....................... | 382/165 |
| 6,912,057 B1 * | 6/2005 | Idehara | ....................... | 358/1.1 |
| 6,995,852 B1 * | 2/2006 | Urasawa | .................... | 358/1.15 |
| 7,126,702 B2 * | 10/2006 | Iwai | .......................... | 358/1.13 |
| 2001/0016077 A1 | 8/2001 | Oki | ............................ | 382/240 |

FOREIGN PATENT DOCUMENTS

| | | |
|---|---|---|
| JP | 10-285421 | 10/1998 |
| JP | 2001-222392 | 8/2001 |
| JP | 2002-094809 | 3/2002 |

OTHER PUBLICATIONS

Jun. 19, 2007 Notification of Reasons for Refusal in Japanese Patent Application No. 2002-129082.

* cited by examiner

*Primary Examiner*—King Y Poon
*Assistant Examiner*—Steven Kau
(74) *Attorney, Agent, or Firm*—Fitzpatrick, Cella, Harper & Scinto

(57) ABSTRACT

An information processing apparatus accurately and automatically determines whether a page to be printed out or rendered is a color page or a monochrome page. In order to efficiently output the page, color/monochrome determination is performed to the page by examining all the pixels forming a bitmap image based on the bitmap image and an attribute bitmap image.

7 Claims, 9 Drawing Sheets

OBJECT 1
ATTRIBUTE=CHARACTER, COLOR ATTRIBUTE=K, PRINTING POSITION (X AND Y),
FONT NAME, SIZE, CHARACTER CODE=(A, B, AND C), COLOR=BLACK (255, 255, 255)
OBJECT 2
ATTRIBUTE=FIGURE, COLOR ATTRIBUTE=K, PRINTING POSITION (X AND Y),
SHAPE=CIRCLE, RADIUS, COLOR=RED (255, 0, 0)
OBJECT 3
ATTRIBUTE=IMAGE, COLOR ATTRIBUTE=MCYK, PRINTING POSITION (X AND Y),
WIDTH, HEIGHT, MATRIX, AND POINTER

OBJECT 1
ATTRIBUTE=CHARACTER, PRINTING POSITION (X AND Y), FONT, SIZE, CHARACTER CODE=(A, B, AND C), COLOR
OBJECT 2
ATTRIBUTE=FIGURE, PRINTING POSITION (X AND Y), SHAPE=CIRCLE, RADIUS, COLOR
OBJECT 3
ATTRIBUTE=IMAGE, PRINTING POSITION (X AND Y), WIDTH, HEIGHT, MATRIX, AND POINTER

INFORMATION PROCESSING APPARATUS, INFORMATION PROCESSING SYSTEM, INFORMATION OUTPUT CONTROL METHOD, STORAGE MEDIUM AND PROGRAM

BACKGROUND OF THE INVENTION

1. Field of the Invention

The present invention relates to an information processing apparatus, an information processing system, an information output control method, a storage medium, and a program.

2. Description of the Related Art

When printout is performed by using a known printing apparatus (printer, for example) for printing out information in a color or monochrome page, an input rendering command is converted to intermediate data, the intermediate data is rendered to a first bitmap, attribute information of the intermediate data is associated with each pixel of the first bitmap so as to be held, the first bitmap is converted to a second bitmap by using the held information, and the conversion result is supplied to a printer engine.

Also, the above-described printing apparatus automatically determines whether the information to be printed out (rendered) is color-page information or monochrome-page information, by using one of the following two methods (1) and (2).

<Automatic Determination Method (1)>

At the time when intermediate data of a page is generated by converting an input rendering command to intermediate data, it is determined whether the intermediate data of this page is data of a color page or a monochrome page.

That is, when the entire intermediate data is monochrome data, it is determined that the page is a monochrome page, and the intermediate data is rendered in 8-bits/pixel gray on a first bitmap. Then, the first bitmap is converted to a second bitmap in 4-bits/pixel K, and the conversion result is transferred to a printer engine.

On the other hand, when one or more pieces of color data exist in the intermediate data, that page is determined to be a color page. In this case, the intermediate data is rendered to the first bitmap in 8-bits/pixel RGB, the first bitmap is converted to a second bitmap in 4-bits/pixel MCYK, and the conversion result is transferred to the printer engine.

FIG. 8B shows an example of the intermediate data. The intermediate data is stored in an intermediate buffer. FIG. 8A shows a desired result of printing generated by using the intermediate data.

Specifically, as shown in FIG. 8B, the intermediate data includes object 1: attribute=character, printing position (X and Y), font, size, character code, and color; object 2: attribute=figure, printing position (X and Y), shape=circle, radius, and color; and object 3: attribute=image, printing position (X and Y), width, height, and matrix of an image, and a pointer for the image substance.

As described above, the intermediate data includes information such as the form, color, and printing position of each of the rendering objects 1 to 3. Also, the color information of each rendering object is information of 8-bits/pixel RGB.

When the intermediate data shown in FIG. 8B is rendered by a renderer, a result which is equivalent to the printing result as shown in FIG. 8A can be obtained.

Accordingly, the intermediate data as shown in FIG. 8B is determined to be color-page data or monochrome-page data in the following way. The color information of objects 1 to 3 includes 8-bits/pixel RGB information. When the condition R=G=B is satisfied in the color information of the objects 1 and 2 and when the condition R=G=B is satisfied in all the pixels of the image of the object 3, the page is determined to be a monochrome page, and otherwise, the page is determined to be a color page.

<Automatic Determination Method (2)>

At the time when intermediate data of a page is generated by converting an input rendering command to intermediate data, the intermediate data is rendered to the first bitmap in 8-bits/pixel RGB. When one page of the first bitmap is generated, it is determined whether the data is color-page data or monochrome-page data.

That is, when the condition R=G=B is satisfied in all the pixels of the first bitmap, the page is determined to be a monochrome page, the first bitmap is converted to a second bitmap in 4-bits/pixel K, and the conversion result is transferred to the printer engine.

On the other hand, when one or more pixels in which the condition R=G=B is not satisfied exist in the first bitmap, the page is determined to be a color page, the first bitmap is converted to a second bitmap in 4-bits/pixel MCYK, and the conversion result is transferred to the printer engine.

In the above-described printing apparatus, however, the following problems (1) and (2) are caused when the printing apparatus automatically determines whether information to be printed out (rendered) is color-page information or monochrome-page information.

<Problem (1)>

For example, in the intermediate data shown in FIG. 8B, when the color information of object 1 is color information and when the color information of objects 2 and 3 is monochrome information, the page is determined to be a color page.

When object 2 is rendered over object 1, color information does not appear in the printing result. In this case, the page is determined to be a color page although the page should be determined to be a monochrome page.

<Problem (2)>

When the intermediate data is rendered to the first bitmap in 8-bits/pixel RGB and then the first bitmap is converted to a second bitmap in 4-bits/pixel MCYK, a user wants to freely select to print (render) R=G=B pixel with a single color of K or a mixture of MCYK. Also, the user wants to freely select to print (render) R=G=B pixel with a single color of K or a mixture of MCYK in each type of object, such as a character, a figure, or an image.

However, when the condition R=G=B is satisfied in all the pixels of the first bitmap and therefore the page is determined to be a monochrome page, the used cannot select to print (render) the page with only K or a mixture of MCYK.

SUMMARY OF THE INVENTION

The present invention has been made to overcome the above-described problems, and it is an object of the present invention to provide an information processing apparatus, an information processing system, an information output control method, a computer-readable storage medium which stores a program for realizing the method, and the program, in which it can be accurately determined whether a page to be printed out (rendered) is a color page or a monochrome page and the page can be efficiently output.

In order to achieve the object, the present invention provides an information processing apparatus for rendering and outputting arbitrary information in units of pages. The apparatus comprises: an intermediate-data generating unit for generating intermediate data including information about a rendering object on a page based on an input rendering command; a first-bitmap generating unit for generating a first bitmap image of the page based on the intermediate data obtained in the intermediate-data generating unit; an attribute-bitmap generating unit for generating an attribute bitmap image including attribute information corresponding to each pixel forming the first bitmap image obtained in the first-bitmap generating unit based on the intermediate data obtained in the intermediate-data generating unit; a determination unit for performing color/monochrome determination for each of all the pixels forming the first bitmap image based on the attribute bitmap image obtained in the attribute-bitmap generating unit and the first bitmap image obtained in the first-bitmap generating unit; and a conversion unit for converting the first bitmap image obtained in the first-bitmap generating unit to a second bitmap image to be rendered and output based on a determination result obtained in the determination unit.

Also, the present invention provides an information output control method for rendering and outputting arbitrary information in units of pages. The method comprises: a step of converting an input rendering command to intermediate data; a step of rendering the intermediate data to a first bitmap; a step of holding attribute information corresponding to each pixel forming the first bitmap by using the intermediate data and the attribute information of the intermediate data; a step of determining whether a page is a color page or a monochrome page by examining all pixels forming the page based on the first bitmap and the held attribute information; and a step of converting the first bitmap to a second bitmap by using the held attribute information based on the determination result.

Further, the present invention provides a program for controlling a computer to function as predetermined units. The units comprise: an intermediate-data generating unit for generating intermediate data including information about a rendering object on a page based on an input rendering command; a first-bitmap generating unit for generating a first bitmap image of the page based on the intermediate data obtained in the intermediate-data generating unit; an attribute-bitmap generating unit for generating an attribute bitmap image including attribute information corresponding to each pixel forming the first bitmap image obtained in the first-bitmap generating unit based on the intermediate data obtained in the intermediate-data generating unit; a determination unit for performing color/monochrome determination for each of all the pixels forming the first bitmap image based on the attribute bitmap image obtained in the attribute-bitmap generating unit and the first bitmap image obtained in the first-bitmap generating unit; and a conversion unit for converting the first bitmap image obtained in the first-bitmap generating unit to a second bitmap image to be rendered and output based on a determination result obtained in the determination unit.

Further, the present invention provides a program for allowing a computer to execute predetermined steps. The steps comprise: a step of converting an input rendering command to intermediate data; a step of rendering the intermediate data to a first bitmap; a step of holding attribute information corresponding to each pixel forming the first bitmap by using the intermediate data and the attribute information of the intermediate data; a step of determining whether a page is a color page or a monochrome page by examining all pixels forming the page based on the first bitmap and the held attribute information; and a step of converting the first bitmap to a second bitmap by using the held attribute information based on the determination result.

Further, the present invention provides a computer-readable storage medium in which the above-described program is recorded.

Further objects, features and advantages of the present invention will become apparent from the following description of the preferred embodiments with reference to the attached drawings.

BRIEF DESCRIPTION OF THE DRAWINGS

FIG. 3 illustrates intermediate data stored in an intermediate buffer in the control structure.

DESCRIPTION OF THE PREFERRED EMBODIMENTS

Hereinafter, embodiments of the present invention will be described with reference to the drawings.

First Embodiment

Figure 1:
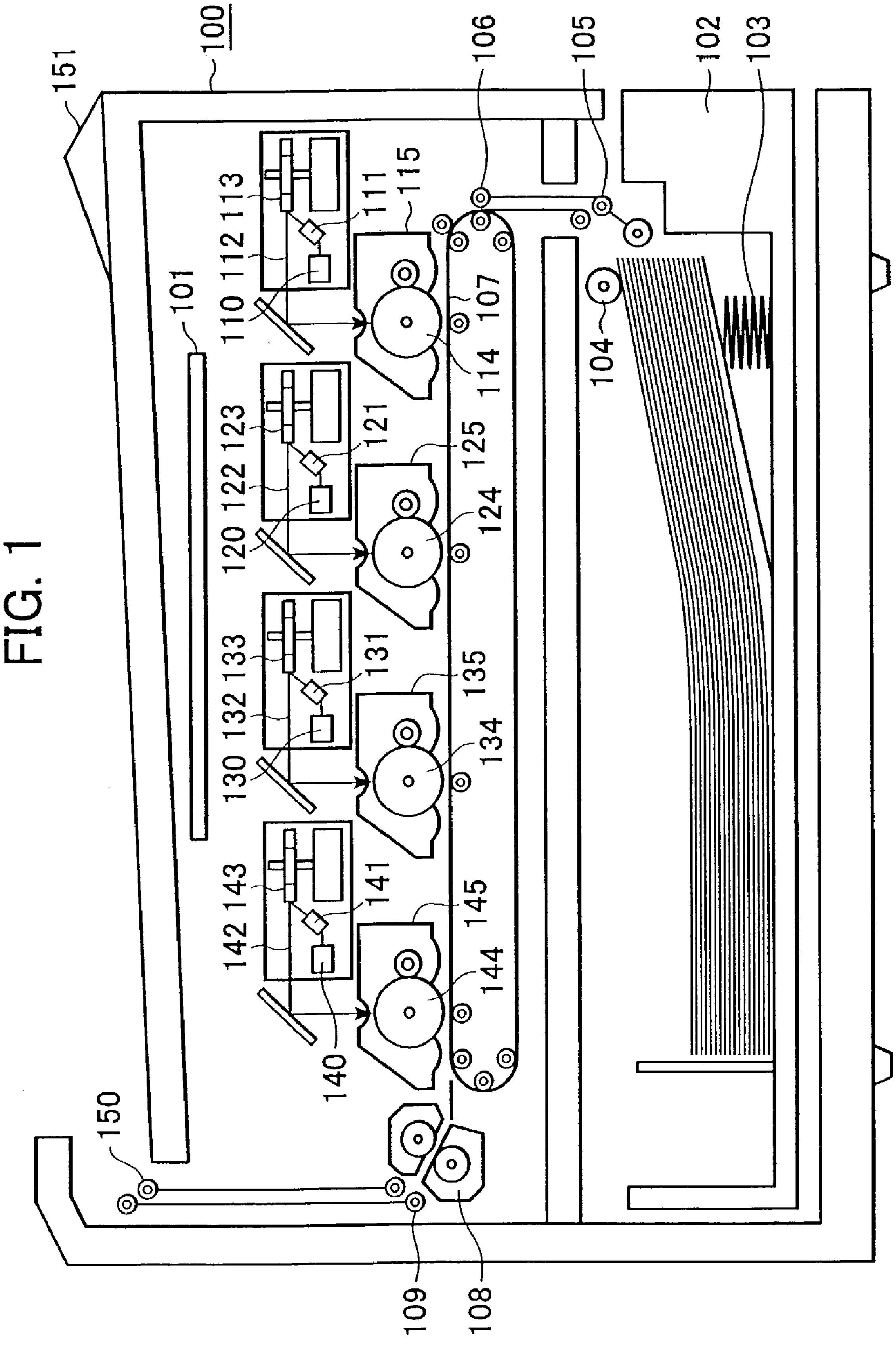
FIG. 1 is a block diagram showing the configuration of a laser-beam printer (LBP) using the present invention.
Figures 2, 2A:
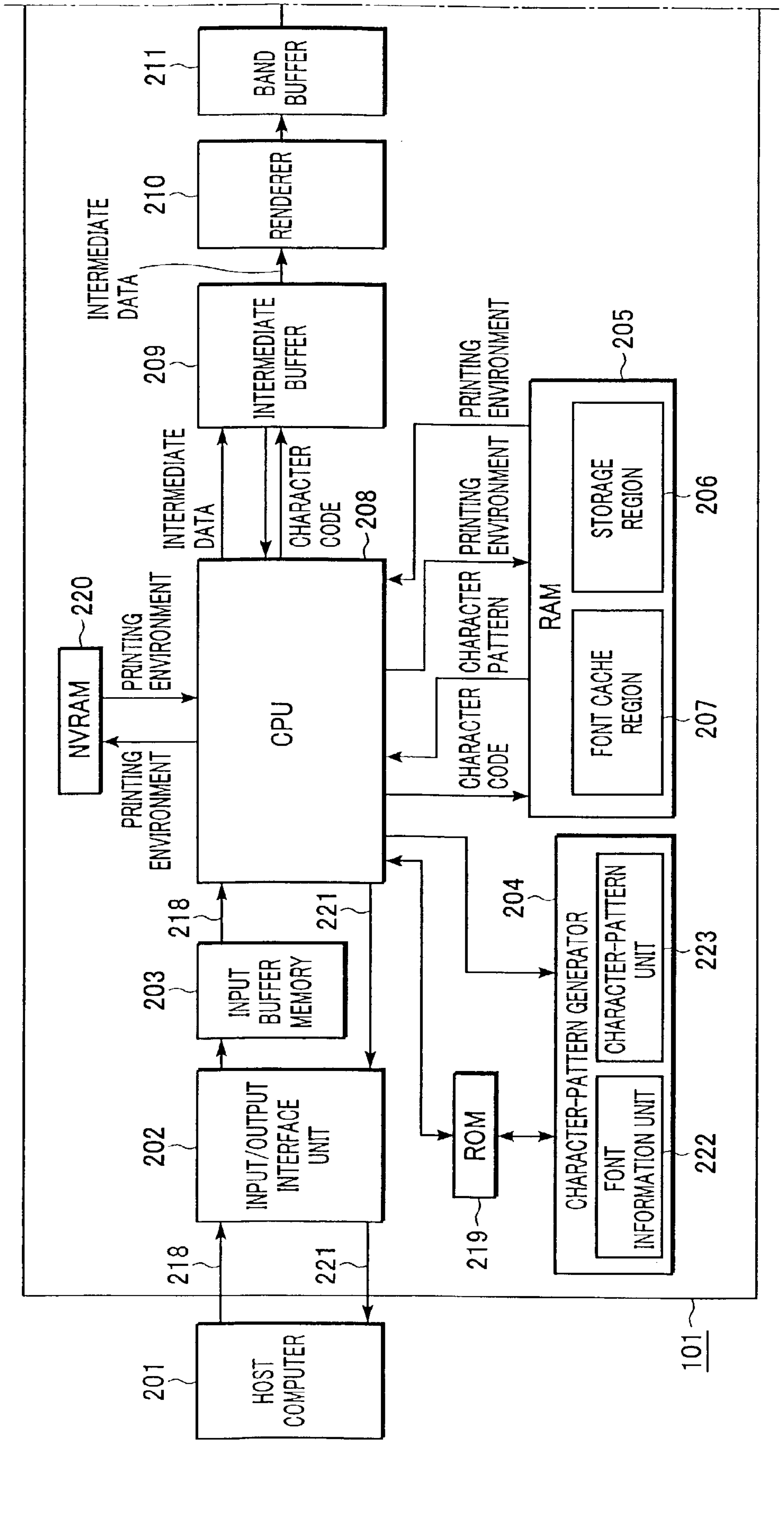
FIG. 2 is a block diagram showing the control structure of the LBP.
Figure 2B:
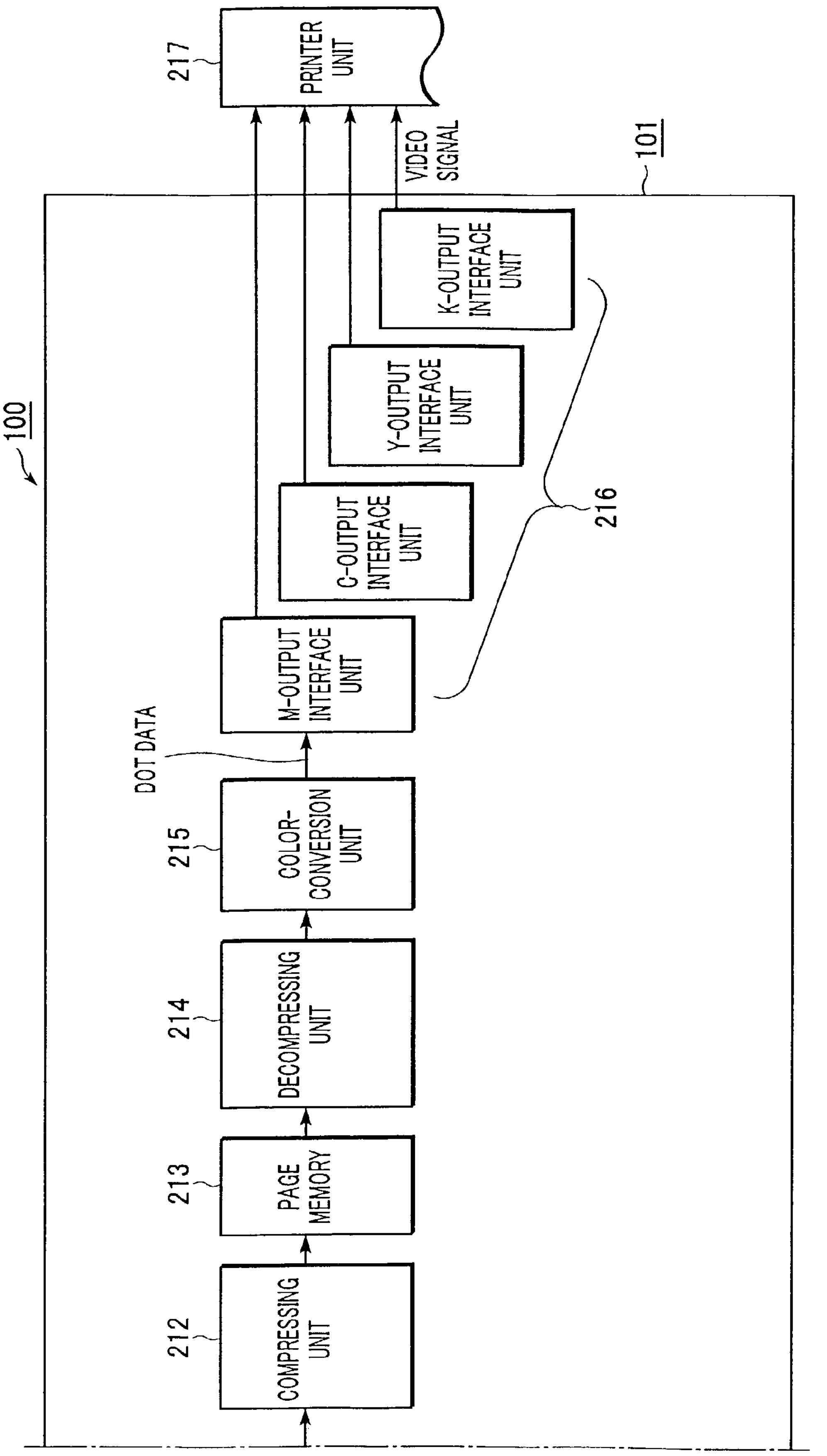

The present invention is applied, for example, to a laser-beam printer (LBP) 100 shown in FIGS. 1 and 2.

FIG. 1 shows the internal configuration of the LBP 100 and FIG. 2 shows the control structure of the LBP 100.

<Internal Configuration of LBP 100: See FIG. 1>

The LBP 100 receives character-printing commands, figure-rendering commands, image-rendering commands, and color-specifying commands, which are supplied from an externally-connected host computer (a host computer 201 shown in FIG. 2), so as to generate corresponding data including character pattern, figures, or images. Accordingly, an image based on the data is formed on recording paper, which is the recording medium.

In FIG. 1, an operation panel 151 includes switches used for various operations and a display unit for displaying the state of the LBP 100, such as a light-emitting diode (LED) display or a liquid crystal display (LCD).

A printer-control unit 101, which will be described later, controls the operation of the entire LBP 100 and analyzes the character-printing commands and so on supplied from the host computer 201.

In this embodiment, the LBP 100 converts RGB color information to magenta (M), cyan (C), yellow (Y), and black (K), and forms and develops images by using these colors in parallel. Therefore, the LBP 100 includes an image forming/developing mechanism for each of MCYK. Accordingly, the printer-control unit 101 generates a print image for each of MCYK, the print images are converted to video signals, and each of the video signals is output to a corresponding laser driver. The image forming/developing mechanism for each of MCYK includes a laser driver, a semiconductor laser, a laser beam, a rotary polygon mirror, an electrostatic drum, and a developing unit.

A laser driver 110 for magenta drives a semiconductor laser 111. More specifically, the laser driver 110 performs ON/OFF-switching of a laser beam 112 radiated from the semiconductor laser 111, in accordance with the video signal input from the printer-control unit 101.

The laser beam 112 is directed in the right and left directions by a rotary polygon mirror 113 so as to scan over an electrostatic drum 114. Accordingly, an electrostatic latent image of a character or figure pattern is formed on the electrostatic drum 114. The latent image is developed by a developing unit (toner cartridge) 115 provided around the electrostatic drum 114 and is then transferred onto the recording paper.

The same image forming/developing mechanism as that for magenta is provided for each of cyan, yellow, and black. That is, in FIG. 1, reference numerals 120 to 125 correspond to the image forming/developing mechanism for cyan, reference numerals 130 to 135 correspond to the image forming/developing mechanism for yellow, and reference numerals 140 to 145 correspond to the image forming/developing mechanism for black. The image forming/developing mechanism for each of cyan, yellow, and black is the same as that for magenta, and thus the corresponding description will be omitted.

In the LBP 100, cut sheets are used as recording paper. The cut sheets are accommodated in a paper-feed cassette 102 which is attached to the LBP 100, and are held at a predetermined height by a spring 103. Each sheet is taken into the LBP 100 by a paper-feed roller 104 and conveyer rollers 105 and 106, and passes through the above-described image forming/developing mechanisms for MCYK, being conveyed by a paper-conveyer belt 107.

Each of MCYK toners (powder ink) which has been transferred onto the sheet is fixed on the sheet by means of the heat and pressure generated by a fuser 108, and the sheet is output to the upper portion of the main body of the LBP 100 by conveyer rollers 109 and 150.

<Control Structure of LBP 100: See FIG. 2>

FIG. 2 shows the control structure of the LBP 100, that is, the internal configuration of the printer-control unit 101 shown in FIG. 1.

The printer-control unit 101 controls the operation of the entire LBP 100. Also, the printer-control unit 101 receives data 218 including rendering commands for characters, figures, or images and color information transmitted from the host computer 201, which is the source of the information to be printed, and generates document information in page units so as to print the information.

In FIG. 2, the printer-control unit 101 includes an input/output interface unit 202 used for transmitting/receiving various pieces of information (218 and 221) to/from the host computer 201 and an input buffer 203 for temporarily storing the various pieces of information input through the input/output interface unit 202.

Also, a character-pattern generator 204 is provided. The character-pattern generator 204 includes a font information unit 222 containing attributes such as the width and height of characters and the address of an actual character pattern, a character-pattern unit 223 containing a character pattern itself, and a reading control program therefor. The reading control program is stored in a ROM 219 and includes a code-converting function for calculating the address of the character pattern corresponding to a character code when the character code is input.

A RAM 205 is also provided. The RAM 205 includes a font cache region 207 for storing the character pattern output from the character-pattern generator 204 and a storage region 206 for storing external-character fonts, form information, and the current printing environment, which are transmitted from the host computer 201.

With the above-described configuration, since pattern information, which has expanded to a character pattern, is stored in the font cache region 207 as a font cache, the same character need not be decoded again for pattern expansion when the same character is printed. Thus, a character pattern can be rapidly obtained.

A CPU 208 controls the entire control system of the LBP 100. The CPU 208 controls the operation of the entire LBP 100 by reading and executing a control program which is stored in the ROM 219.

An intermediate buffer 209 stores internal data which is generated based on the input data 218. Herein, data corresponding to a page is received and the data is converted to simpler intermediate data, which is stored in the intermediate buffer 209.

A renderer 210 renders the intermediate data stored in the intermediate buffer 209 in units of lines so as to generate a print image.

A band buffer 211 stores the print image generated by the renderer 210. The renderer 210 generates an 8-bits/pixel RGB rendering bitmap image in units of lines, and at the same time, generates a 4-bits/pixel attribute bitmap image including: 3-bits/pixel information indicating whether each pixel is a character, a figure, or an image; and 1-bit/pixel information indicating whether printing (rendering) should be performed with only K or a mixture of MCYK when R=G=B.

The band buffer 211 is formed so as to store an RGB rendering bitmap image and an attribute bitmap image of at least 8 lines. At this time, the rendering bitmap image and the attribute bitmap image are individually compressed and are stored in the band buffer 211.

A compressing unit 212 compresses the image stored in the band buffer 211 in units of scanning lines.

A page memory 213 stores the compressed data obtained in the compressing unit 212.

A decompressing unit 214 decompresses the compressed data stored in the page memory 213. After the renderer 210 has rendered the intermediate data of a page stored in the intermediate buffer 209 and the result is compressed by the compressing unit 212 so as to be stored in the page memory 213, the decompressing unit 214 reads the result in units of lines and decompresses it. At this time, the decompressing unit 214 individually reads and decompresses the compressed data of the rendering bitmap image and the compressed data of the attribute bitmap image.

A color-conversion unit 215 converts the data (8-bits/pixel RGB bitmap image) obtained in the decompressing unit 214 to a 4-bits/pixel MCYK bitmap image and also performs gamma correction.

The color-conversion unit 215 changes the color-conversion method in accordance with the type of corresponding attribute bitmap pixel when each pixel of the rendering bitmap image is color-converted.

Specifically, the color-conversion unit 215 converts 8-bits/pixel RGB to 8-bits/pixel MCYK based on 1-bit/pixel information indicating whether printing is to be performed only with K or with a mixture of MCYK. Then, the color-conversion unit 215 converts the 8-bits/pixel MCYK to 4-bits/pixel MCYK based on 3-bits/pixel information indicating whether each pixel is a character, a figure, or an image.

An MCYK output interface unit 216 converts the 4-bits/pixel MCYK bitmap image obtained in the color-conversion unit 215 to video signals, which are output.

A printer unit 217 corresponds to the printer mechanism of the LBP 100 shown in FIG. 1 and prints out image information based on the output from the MCYK output interface unit 216.

More specifically, in the LBP 100 of this embodiment, image formation/development of MCYK are performed in parallel. Thus, the output interface unit 216 includes an M-output interface unit, a C-output interface unit, a Y-output interface unit, and a K-output interface unit. Each of these output interface units independently obtains dot data from the color-conversion unit 215, converts the dot data to a video signal, and outputs the video signal to the laser driver 110, 120, 130, or 140 in each plane of the printer unit 217 (see FIG. 1).

A nonvolatile memory 220 includes a general EEPROM or the like and is hereinafter referred to as an NVRAM. A panel set value specified using the operation panel 151 is stored in the NVRAM 220.

Further, the ROM 219 stores the analysis result of data input from the host computer 201, intermediate data, the control program of the LBP 100, a color-conversion table from an RGB color space to an MCYK color space, a gamma correction table for each of MCYK, and so on.

In this embodiment, the color LBP 100 is used as an example of a printing apparatus to which the present invention is applied. However, the present invention can be applied to other types of color printers, such as color inkjet printers and color thermal transfer printers.

The renderer 210 generates an 8-bits/pixel RGB rendering bitmap image. However, the renderer 210 may generate an 8-bits/pixel MCYK rendering bitmap image in units of lines. Alternatively, the renderer 210 may generate an 8-bits/pixel gray rendering bitmap image in units of lines.

In this embodiment, the number of bits/pixel for each color may have any value. In this case, the configurations of the band buffer 211, the compressing unit 212, the page memory 213, and the decompressing unit 214 are made to correspond to the color space and bits/pixel which are generated by the renderer 210.

Also, the color-conversion unit 215 may convert the data generated by the renderer 210 to a color space and bits/pixel corresponding to the output interface unit 216.

<Intermediate Data>

Hereinafter, an example of the intermediate data stored in the intermediate buffer 209 will be described.

Figure 4A:
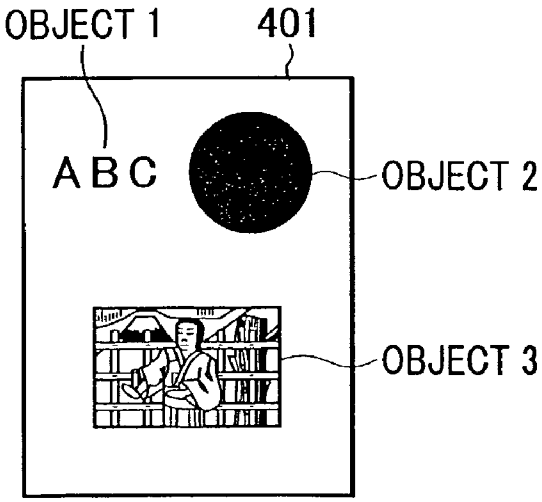
FIGS. 4A to 4C show a rendering bitmap image and an attribute bitmap image generated in a renderer of the control structure and a second bitmap image generated in a color-conversion unit of the control structure.
Figure 4B:
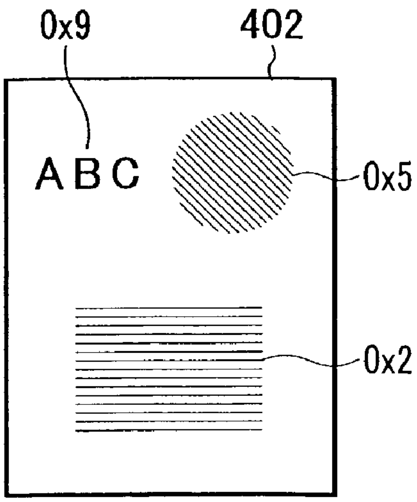
Figure 4C:
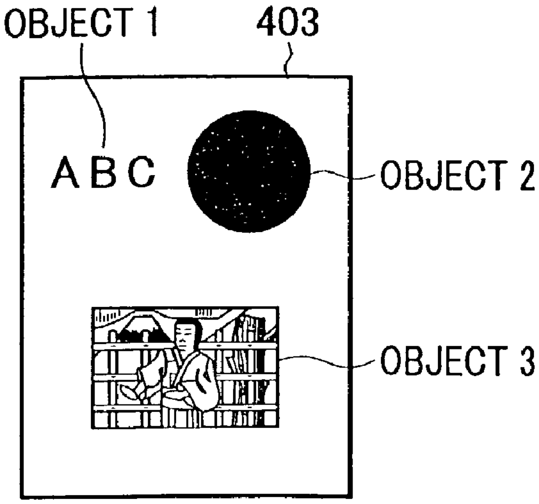

FIG. 3 shows intermediate data 300 stored in the intermediate buffer 209. FIG. 4A shows a rendering bitmap image 401 generated by the renderer 210, FIG. 4B shows an attribute bitmap image 402 generated by the renderer 210, and FIG. 4C shows a second bitmap image 403 generated by the color-conversion unit 215.

First, the CPU 208 determines whether the input data (input command) 218 from the input buffer 203 is a character command, a figure command, or an image command, and also determines whether the data should be printed with only K or a mixture of MCYK. Then, the CPU 208 sets each flag to the intermediate data 300, which will be stored in the intermediate buffer 209, based on the determination result.

More specifically, as shown in FIG. 3, the CPU 208 sets object 1: attribute=character, color attribute=K, printing position (X and Y), font, size, character code, color, and rendering logic; object 2: attribute=figure, color attribute=K, printing position (X and Y), shape (circle), radius, color, and rendering logic; and object 3: attribute=image, color attribute=MCYK, printing position (X and Y), width and height of image, pointer for image substance, and rendering logic. Herein, the rendering logic of all the rendering objects 1 to 3 is S (overwrite) specification.

As shown in FIG. 3, the intermediate data 300 includes information about the shape, color, and printing position of each of the rendering objects 1 to 3.

As described above, the renderer 210 processes the intermediate data 300 stored in the intermediate buffer 209 so as to generate an 8-bits/pixel RGB rendering bitmap image in units of lines, and at the same time, generates a 4-bits/pixel attribute bitmap image including: 3-bits/pixel information indicating whether each pixel is a character, a figure, or an image; and 1-bit/pixel information indicating whether printing (rendering) should be performed with only K or a mixture of MCYK when R=G=B.

As a result, the attribute bitmap image 402 shown in FIG. 4B as well as the rendering bitmap image 401 shown in FIG. 4A can be obtained.

Herein, the rendering bitmap image 401 is generated by rendering the intermediate data 300 in 8-bits/pixel RGB, and the attribute bitmap image 402 is generated by rendering the intermediate data 300 in 4-bits/pixel based on the attribute and the color attribute of the intermediate data 300.

The contents of 4-bits/pixel are as follows:

bit 0: 1 when color attribute is K, and 0 when color attribute is MCYK bit 1: 1 when attribute is image, otherwise 0 bit 2: 1 when attribute is figure, otherwise 0 bit 3: 1 when attribute is character, otherwise 0

Accordingly, for example, a character region is rendered as 0×9, a figure region is rendered as 0×5, and an image region is rendered as 0×2.

The color-conversion unit 215 converts an 8-bits/pixel RGB bitmap image (rendering bitmap image 401) to a 4-bits/pixel MCYK bitmap image (second bitmap image 403). At this time, the parameters of the converting process are changed based on the attribute bitmap image 402.

More specifically, the color-conversion unit 215 first converts a pixel (8-bits/pixel RGB) in the rendering bitmap image 401 to 8-bits/pixel MCYK based on bit 0 (1-bit/pixel information indicating whether printing is to be performed only with K or a mixture of MCYK) of the attribute bitmap image 402.

At this time, when the condition R=G=B is satisfied in the pixel on the rendering bitmap image 401 corresponding to a pixel in which bit 0 is K in the attribute bitmap image 402, the color-conversion unit 215 converts RGB to MCYK by using a look up table (LUT) which ensures the condition Y=M=C=0. On the other hand, when the condition R=G=B is satisfied in the pixel on the rendering bitmap image 401 corresponding to a pixel in which bit 0 is MCYK in the attribute bitmap image 402, the color-conversion unit 215 converts RGB to MCYK by using a look up table (LUT) which does not ensure the condition Y=M=C=0.

Then, the color-conversion unit 215 converts the pixel (8-bits/pixel MCYK) in the rendering bitmap image 401 to 4-bits/pixel MCYK based on bit 1 to bit 3 (3-bits/pixel information indicating whether each pixel is a character, a figure, or an image) of the attribute bitmap image 402.

Specifically, the color-conversion unit 215 converts the pixel (8-bits/pixel MCYK) on the rendering bitmap image 401 corresponding to a pixel in which bit 1 is 1 in the attribute bitmap image 402, to 4-bits/pixel MCYK by using a half-tone parameter for image.

Also, the color-converting unit 215 converts the pixel (8-bits/pixel MCYK) of the rendering bitmap image corresponding to a pixel in which bit 2 is 1 in the attribute bitmap image 402, to 4-bits/pixel MCYK by using a half-tone parameter for figure.

Also, the color-converting unit 215 converts the pixel (8-bits/pixel MCYK) of the rendering bitmap image corresponding to a pixel in which bit 3 is 1 in the attribute bitmap image 402, to 4-bits/pixel MCYK by using a half-tone parameter for character.

With the above-described configuration, the second bitmap image 403 can be generated by using optimal color-conversion parameters and half-tone parameters in each region.

<Operation of LBP 100>

Figure 5:
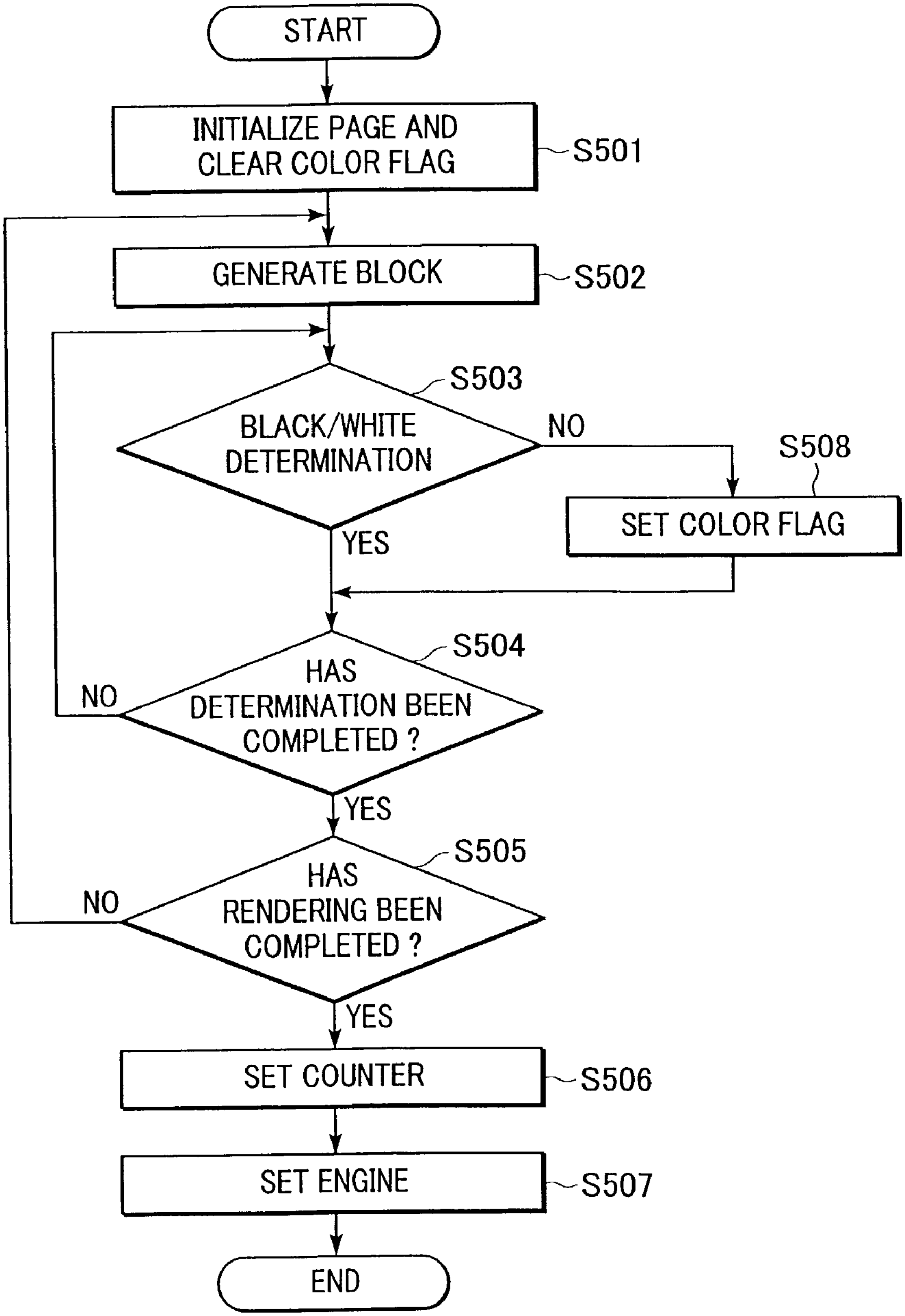
FIG. 5 is a flowchart illustrating an operation of the LBP.

FIG. 5 is a flowchart illustrating an operation of the LBP 100.

Step S501:

The CPU 208 stores intermediate data of a page in the intermediate buffer 209 and then starts the renderer 210. But before these operations, the CPU 208 clears a color flag used for determining whether the page is a color page or a monochrome page (flag=0). When the color flag is set (flag=1), the page is a color page, and when the flag is clear (flag=0), the page is a monochrome page.

Step S502:

When the renderer 210 is started by the CPU 208, the renderer 210 renders the intermediate data stored in the intermediate buffer 209 in units of lines so as to generate an 8-bits/pixel RGB rendering bitmap image. At the same time, the renderer 210 generates a 4-bits/pixel attribute bitmap image including: 3-bits/pixel information indicating whether each pixel is a character, a figure, or an image; and 1-bit/pixel information indicating whether printing (rendering) should be performed with only K or a mixture of MCYK when R=G=B. Then, the renderer 210 stores the image data in the band buffer 211.

Step S503:

The CPU 208 performs black/white determination to each pixel forming the image data in the band buffer 211. That is, the CPU 208 determines whether or not the condition R=G=B is satisfied in the 8-bits/pixel RGB bitmap image and whether or not bit 0 (1-bit/pixel information indicating whether printing should be performed with only K or with a mixture of MCYK) of the 4-bits/pixel attribute bitmap image is 1 (print with only K). If the determination result is affirmative, the process proceeds to step S504. Otherwise, the process proceeds to step S508.

Step S504

When the condition R=G=B is satisfied in the 8-bits/pixel RGB bitmap image and when bit 0 (1-bit/pixel information indicating whether printing should be performed with only K or with a mixture of MCYK) of the 4-bits/pixel attribute bitmap image is 1 (print with only K) in step S503, the CPU 208 determines whether or not black/white determination for all pixels in the band buffer 211 has been completed. If the black/white determination has been completed, the process proceeds to step S505, and otherwise, the process returns to step S503.

Step S505:

If black/white determination for all pixels in the band buffer 211 has been completed in step S504, the CPU 208 determines whether or not the renderer 210 has rendered the data of a page. If the data of the page has been rendered, the process proceeds to step S506, and otherwise, the process returns to step S502.

Step S506:

If the page has been rendered in step S505, the CPU 208 updates a page counter based on the color flag. That is, the CPU 208 increments a counter for monochrome pages when the color flag indicates a monochrome page and increments a counter for color pages when the color flag indicates a color page. In this page counter, the number can be transmitted to the host computer 201 via the input/output interface unit 202. Also, the total number of pages which have been printed by the printer unit 217 can be obtained in each of color pages and monochrome pages.

Step S507:

The CPU 208 holds the result of the updated color flag and counter as page information, and notifies the printer unit 217 of the result when the CPU starts the printer unit 217 (printer engine). Accordingly, the printer unit 217 performs a printing operation suitable for a monochrome page when the color flag indicates a monochrome page, and performs a printing operation suitable for a color page when the color flag indicates a color page.

Step S508:

When the values of R, G, and B are different in the 8-bits/pixel RGB bitmap image or when bit 0 of the 4-bits/pixel attribute bitmap image is 0 (print with MCYK) in step S503, the CPU 208 sets the color flag at a color page. Then, the process proceeds to step S504.

Figure 6:
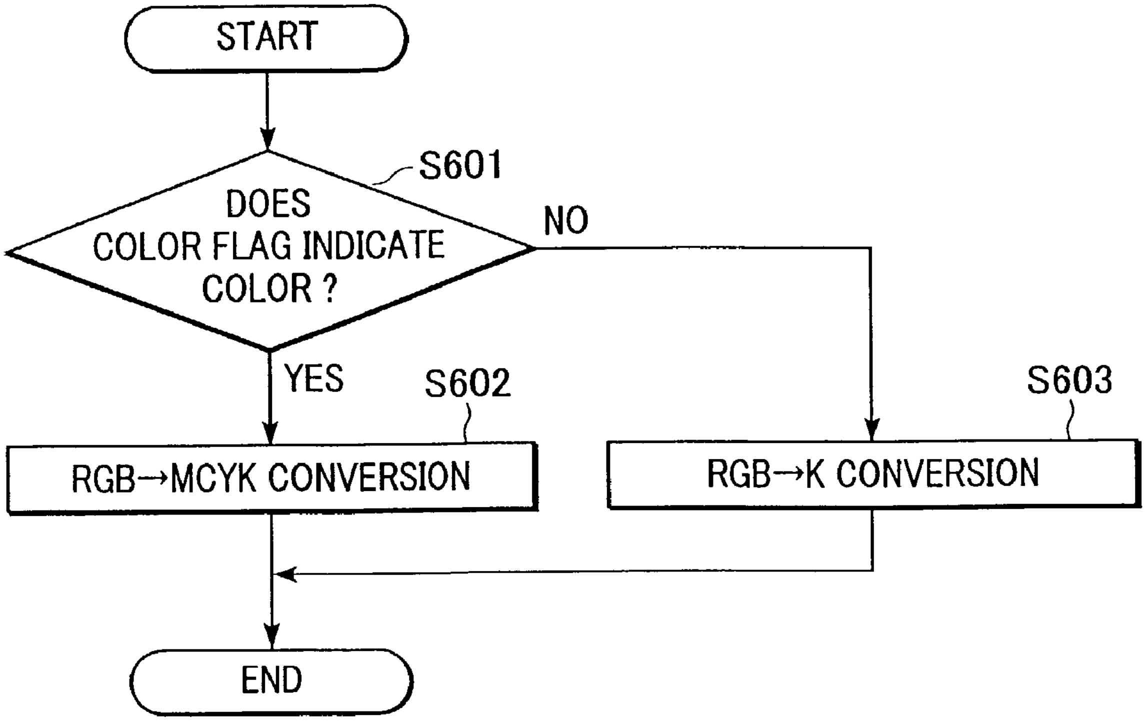
FIG. 6 is a flowchart illustrating an operation which is performed after the above-mentioned operation.

FIG. 6 is a flowchart illustrating an operation of the LBP 100, the operation being performed after the process shown in FIG. 5.

Step S601:

The color-conversion unit 215 refers to the color flag obtained from the CPU 208 before processing data of a page which is supplied from the decompressing unit 214, and determines which type of color conversion is to be performed to the page data. That is, the process proceeds to step S602 when the color flag indicates color, and the process proceeds to step S603 when the color flag indicates black and white.

Step S602:

When the color flag indicates color in step S601, the color-conversion unit 215 performs a normal color-conversion process as described below. The color-conversion unit 215 converts an 8-bits/pixel RGB bitmap image to a 4-bits/pixel MCYK bitmap image and also performs gamma correction. When the color-conversion unit 215 color-converts each pixel of the bitmap image, it changes the color-conversion method in accordance with the type of the corresponding attribute bitmap pixel. More specifically, the color-conversion unit 215 converts 8-bits/pixel RGB to 8-bits/pixel MCYK by using 1-bit/pixel information indicating whether printing is to be performed with only K or with a mixture of MCYK, and converts the 8-bits/pixel MCYK to 4-bits/pixel MCYK by using 3-bits/pixel information indicating whether each pixel is a character, a figure, or an image.

Step S603

When the color flag indicates black and white in step S601, the color-conversion unit 215 performs a color-conversion process for a monochrome page as described below. The color-conversion unit 215 converts an 8-bits/pixel RGB bitmap image to a 4-bits/pixel K bitmap image, and also performs gamma correction. At this time, when the color-conversion unit 215 performs color-conversion of each pixel of the bitmap image, it changes the color-conversion method in accordance with the type of the corresponding attribute bitmap pixel. More specifically, the color-conversion unit 215 converts 8-bits/pixel RGB to 8-bits/pixel K by using a look up table, and converts 8-bits/pixel MCYK to 4-bits/pixel MCYK by using 3-bits/pixel information indicating whether each pixel is a character, a figure, or an image.

As described above, when the condition R=G=B is satisfied in each of the pixels forming a rendering bitmap image of a page and when the corresponding pixel on the attribute bitmap image is monochrome, the pixel is determined to be a monochrome pixel and otherwise the pixel is determined to be a color pixel. Accordingly, color/monochrome determination of the page can be accurately performed.

Also, a user can freely select to print (render) a pixel in which R=G=B with a single color of K or with a mixture of MCYK, based on the corresponding pixel information (attribute information) on the attribute bitmap image. Also, the user can freely select to print (render) a pixel in which R=G=B with a single color of K or with a mixture of MCYK in each rendering object (the type of object such as a character, a figure, or an image).

Second Embodiment

In the color/monochrome determination according to the first embodiment, when the condition R=G=B is satisfied in each of the pixels (8-bits/pixel RGB) forming the rendering bitmap image of a page rendered by the renderer 210 and when bit 0 (1-bit/pixel information indicating whether printing is to be performed with only K or with a mixture of MCYK) of the corresponding pixel (4-bits/pixel) of the attribute bitmap image is 1 (print with only K), the pixel is determined to be monochrome. Also, the pixel is determined to be color when the values of R, G, and B of the pixel (8-bits/pixel RGB) are different or when bit 0 of the corresponding pixel (4-bits/pixel) of the attribute bitmap image is 0 (print with MCYK).

On the other hand, in color/monochrome determination of the second embodiment, the compressing unit 212 performs 8-bits/pixel RGB to 8-bits/pixel YUV conversion to the rendering bitmap image obtained in the renderer 210. Then, when the condition U=V=0 is satisfied in each of the pixels (8-bits/pixel YUV) forming the rendering bitmap image of the page and when bit 0 (1-bit/pixel information indicating whether printing is to be performed with only K or with a mixture of MCYK) of the corresponding pixel (4-bits/pixel) of the attribute bitmap image is 1 (print with only K), the pixel is determined to be monochrome. Also, the pixel is determined to be color when the value of U or V of the pixel of the 8-bits/pixel YUV bitmap image is not 0 or when bit 0 of the corresponding pixel (4-bits/pixel) of the attribute bitmap image is 0 (print with MCYK).

In the above-described 8-bits/pixel RGB to 8-bits/pixel YUV conversion performed by the compressing unit 212, each of R, G, and B takes on values from 0 to 255, and the conversion process is defined by the following expressions, in which Y is a brightness component and U and V are color components:

$$Y=0.2990\times R+0.5870\times G+0.1140\times B$$

$$U=-0.1686\times R-0.3313\times G+0.5000\times B+128$$

$$V=0.5000\times R-0.4187\times G-0.0813\times B+128$$

The condition U=V=0 means no color component exists.

As described above, in the second embodiment, RGB of the rendering bitmap image of a page is converted to YUV. When the condition U=V=0 is satisfied in each of the pixels forming the rendering bitmap image after the conversion and when the corresponding pixel of the attribute bitmap image indicates monochrome, the pixel is determined to be a monochrome pixel, and otherwise, the pixel is determined to be a color pixel. Accordingly, color/monochrome determination of the page can be accurately performed as in the first embodiment.

Third Embodiment

In the color/monochrome determination according to the first embodiment, when the condition R=G=B is satisfied in each of the pixels (8-bits/pixel RGB) forming the rendering bitmap image of a page rendered by the renderer 210 and when bit 0 (1-bit/pixel information indicating whether printing is to be performed with only K or with a mixture of MCYK) of the corresponding pixel (4-bits/pixel) of the attribute bitmap image is 1 (print with only K), the pixel is determined to be monochrome. Also, the pixel is determined to be color when the values of R, G, and B of the pixel (8-bits/pixel RGB) are different or when bit 0 of the corresponding pixel (4-bits/pixel) of the attribute bitmap image is 0 (print with MCYK).

On the other hand, in the third embodiment, when the bitmap image rendered by the renderer 210 is 8-bits/pixel MCYK, each pixel is determined to be monochrome when the condition Y=M=C=0 is satisfied in the pixel forming the rendering bitmap image (8-bits/pixel MCYK bitmap image) of a page rendered by the renderer 210, and the pixel is determined to be color when any of Y, M, and C of the pixel is not 0.

That is, in the third embodiment, when the condition Y=M=C=0 is satisfied in the MCYK of each of the pixels forming the rendering bitmap image of a page, the pixel is determined to be a monochrome pixel, and otherwise, the pixel is determined to be a color pixel. Accordingly, color/monochrome determination of the page can be accurately performed as in the first embodiment.

In the third embodiment, when the condition Y=M=C=0 is satisfied in the pixel and when the corresponding pixel of the attribute bitmap image is monochrome, the pixel may be determined to be a monochrome pixel, and otherwise, the pixel is determined to be a color pixel.

Fourth Embodiment

In the color/monochrome determination according to the first embodiment, when the condition R=G=B is satisfied in each of the pixels (8-bits/pixel RGB) forming the rendering bitmap image of a page rendered by the renderer 210 and when bit 0 (1-bit/pixel information indicating whether printing is to be performed with only K or with a mixture of MCYK) of the corresponding pixel (4-bits/pixel) of the attribute bitmap image is 1 (print with only K), the pixel is determined to be monochrome. Also, the pixel is determined to be color when the values of R, G, and B of the pixel (8-bits/pixel RGB) are different or when bit 0 of the corresponding pixel (4-bits/pixel) of the attribute bitmap image is 0 (print with MCYK).

On the other hand, in the fourth embodiment, when the bitmap image rendered by the renderer 210 is 8-bits/pixel MCYK, each pixel is determined to be monochrome when the condition Y=M=C=0 is satisfied in the pixel forming the rendering bitmap image (8-bits/pixel MCYK bitmap image) of a page rendered by the renderer 210 and when bit 0 (1-bit/pixel information indicating whether printing is to be performed with only K or with a mixture of MCYK) of the corresponding pixel (4-bits/pixel) of the attribute bitmap image is 1 (print with only K). Also, the pixel is determined to be color when any of Y, M, and C of the pixel is not 0 or when bit 0 of the corresponding pixel (4-bits/pixel) of the attribute bitmap image is 0 (print with MCYK).

That is, in the fourth embodiment, when the condition Y=M=C=0 is satisfied in MCYK of each of the pixels forming the rendering bitmap image of a page and when its attribute information indicates monochrome, the pixel is determined to be a monochrome pixel, and otherwise, the pixel is determined to be a color pixel. Accordingly, color/monochrome determination of the page can be accurately performed as in the first embodiment.

The object of the present invention can be achieved by supplying a storage medium containing a program code of software for realizing the function of the host and the terminal of the first to fourth embodiments to a system or an apparatus, so that the computer (or CPU or MPU) of the system or the apparatus reads and executes the program code stored in the storage medium.

In that case, the program code itself read from the storage medium realizes the function of the first to fourth embodiments. Accordingly, the storage medium containing the program code and the program code are regarded as part of the present invention.

As the storage medium for supplying the program code, the following media can be used: a ROM, a flexible disk, a hard disk, an optical disk, a magnetooptical disk, a CD-ROM, a CD-R, a magnetic tape, and a nonvolatile memory card.

Also, by executing the program code read by the computer, the function of the first to fourth embodiments can be realized. In addition, an OS or the like operated in the computer may execute a part or whole of actual processing based on the instructions of the program code so that the function of the first to fourth embodiments is realized by that processing.

Further, the program code read from the storage medium may be written in a memory included in an expansion board inserted to the computer or a function expanding unit connected to the computer. Then, the CPU or the like in the function expanding board or unit may execute a part or whole of the actual processing based on the instructions of the program code so that the function of the first to fourth embodiments is realized by that processing.

Figure 7:
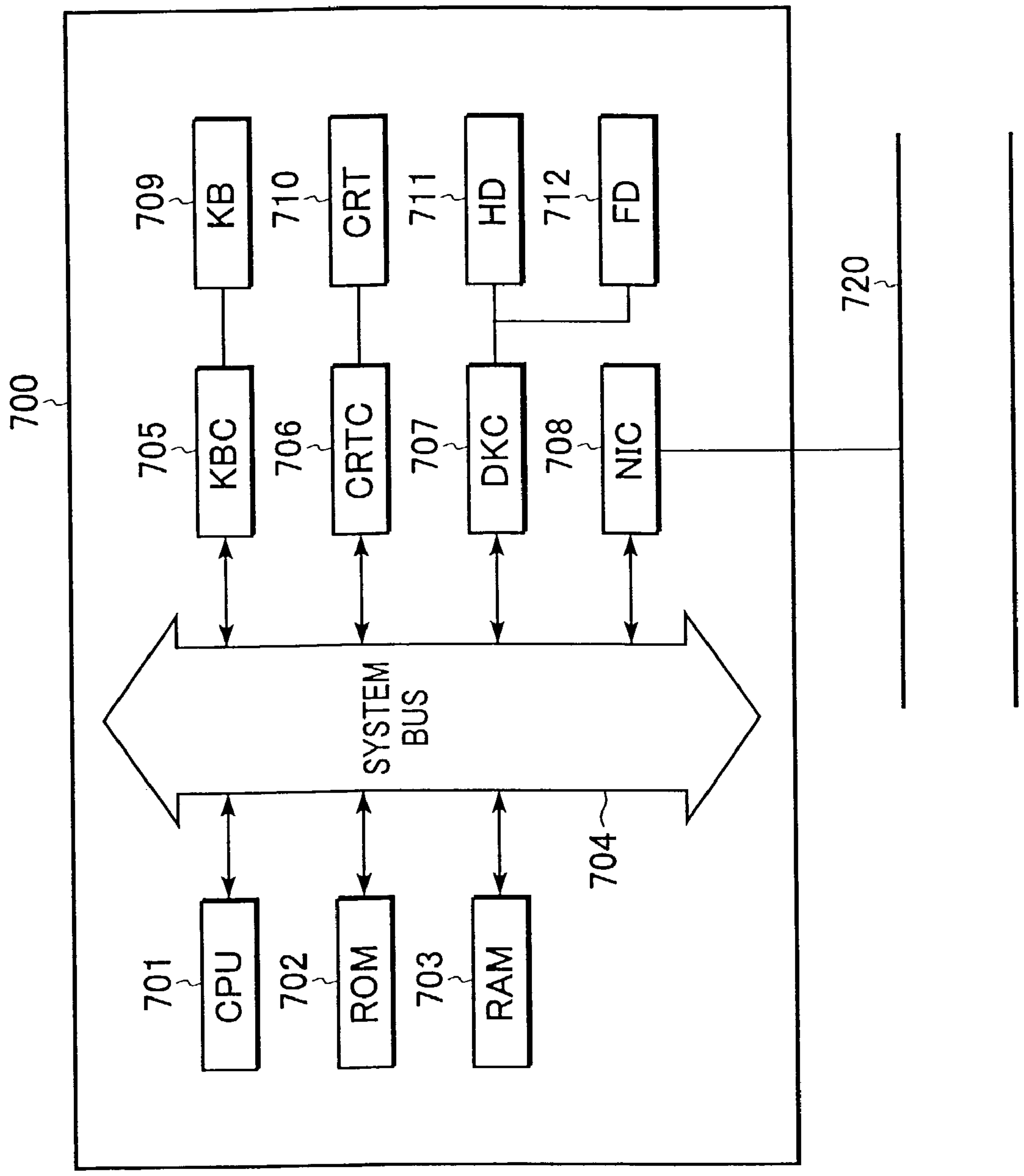
FIG. 7 is a block diagram showing the configuration of a computer which reads a program for allowing the computer to realize the function of the LBP from a computer-readable storage medium and which executes the program.
Figures 8A, 8B:
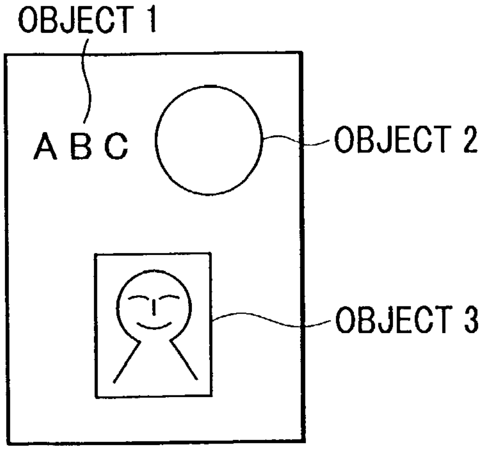
FIGS. 8A and 8B illustrate color/monochrome determination in a known art.

FIG. 7 shows a computer function 700. As shown in FIG. 7, the computer function 700 includes a CPU 701, a ROM 702, a RAM 703, a keyboard controller (KBC) 705 for a keyboard (KB) 709, a CRT controller (CRTC) 706 for a CRT display (CRT) 710 serving as a display unit, a disk controller (DKC) 707 for a hard disk (HD) 711 and a flexible disk (FD) 712, and a network interface controller (NIC) 708 used for connection with a network 720. These devices are connected via a system bus 704 so as to perform communication with each other.

The CPU 701 executes the software stored in the ROM 702 or the HD 711 or the software supplied through the FD 712 so as to comprehensively control each unit connected to the system bus 704. That is, the CPU 701 reads the processing program based on a predetermined sequence from the ROM 702, the HD 711, or the FD 712 and executes the program so as to realize the operations in the first to fourth embodiments.

The RAM 703 functions as a main memory or a work area for the CPU 701.

The KBC 705 controls instructions input through the KB 709 or a pointing device (not shown) or the like.

The CRTC 706 controls the display of the CRT 710.

The DKC 707 controls the access with the HD 711 and the FD 712, which store a boot program, various applications, an edition file, a user file, a network management program, and a predetermined processing program in the first to fourth embodiments.

The NIC 708 transmits/receives data to/from an apparatus or a system on the network 720.

As described above, in the present invention, all the pixels of a page to be rendered and output are examined based on a first bitmap image and an attribute bitmap image (attribute information) so as to determine whether the page to be rendered and output is a color page or a monochrome page. Accordingly, color-page/monochrome-page determination can be accurately performed.

Also, a user can freely select to print (render) an R=G=B pixel with a single color of K or with a mixture of MCYK based on information (attribute information) of the corresponding pixel on the attribute bitmap image. Also, the user can freely select to print (render) an R=G=B pixel with a single color of K or with a mixture of MCYK in each rendering object (the type of object such as a character, a figure, or an image).

Further, by incrementing a color counter when the page is a color page and incrementing a monochrome counter when the page is a monochrome page based on the color/monochrome determination result, log management of a rendering output result can be accurately performed.

Also, by notifying the rendering output side (printer engine or the like) that the page is a color page or a monochrome page based on the color/monochrome determination result, rendering output can be performed at high speed.

Further, by holding a second bitmap in color when the page is a color page and by holding the second bitmap in monochrome when the page is a monochrome page based on the color/monochrome determination result, the memory can be saved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for generating an MCYK bitmap image based on an input rendering command, the information processing apparatus comprising:

an intermediate-data generating unit that generates intermediate data including information about a rendering object on a page based on the input rendering command;

an RGB bitmap generating unit that generates an RGB bitmap image of the page based on the intermediate data obtained in the intermediate-data generating unit;

an attribute-bitmap generating unit that generates an attribute bitmap image including attribute information corresponding to each pixel forming the RGB bitmap image based on the intermediate data obtained in the intermediate-data generating unit, wherein the attribute bit map image indicates whether printing of each pixel should be performed with only K or with MCYK;

a determination unit that performs a color/monochrome determination for each pixel of the RGB bitmap image based on both the attribute bitmap image obtained in the attribute-bitmap generating unit and the RGB bitmap image obtained in the first-bitmap generating unit, the determination unit determining that a pixel is monochrome only when the RGB bitmap image thereof indicates R=G=B and the attribute bit map image indicates that printing of the pixel should be performed with only K; and a conversion unit that converts the RGB bitmap image obtained in the first-bitmap generating unit to the MCYK bitmap image based on a determination result obtained in the determination unit, MCY of a pixel of the MCYK bitmap image being 0 when the determination result for the pixel is monochrome.

2. An information processing apparatus according to claim 1, wherein the attribute-bitmap image generated by the attribute-bitmap generating unit includes information as to whether each pixel represents a character, a figure, or an image, and information indicating whether printing of each pixel should be performed with only black or with color.

3. The information processing apparatus according to claim 1, wherein said apparatus further comprises:

a first interface that receives the rendering command from a host computer; and second interface unit that converts the second bitmap image to video signals, wherein the intermediate-data generating unit is different from the first interface and generates intermediate data including information about the rendering object on the page based on the input rendering command received from the host computer via the interface, wherein the intermediate data includes data on the shape, color, and printing position of the rendering object, and wherein the first-bitmap generating unit comprises a single generating unit that generates the first bitmap image of the page based on the intermediate data obtaining in the intermediate-data generating unit using the first-bitmap generating unit that generates an attribute bitmap image including attribute information corresponding to each pixel forming the first bitmap image based on the intermediate data obtained in the intermediate-data generating unit using the attribute-bitmap generating unit.

4. An information processing method for generating an MCYK bitmap image based on an input rendering command, the information processing method comprising:

generating intermediate data including information about a rendering object on a page based on the input rendering command with an intermediate-data generating unit;

generating an RGB bitmap image of the page based on the intermediate data obtained in the intermediate-data generating operation with an RGB-bitmap image generating unit;

generating with an attribute-bitmap generating unit an attribute bitmap image including attribute information corresponding to each pixel forming the RGB bitmap image based on the intermediate data obtained in the intermediate-data generating operation, wherein the attribute bit map image indicates whether printing of each pixel should be performed with only K or with MCYK;

performing with a color/monochrome determination unit a color/monochrome determination for each pixel of the RGB bitmap image based on both the attribute bitmap image obtained in the attribute-bitmap generating operation and the RGB bitmap image obtained in the first-bitmap generating operation, the determination operation determining that a pixel is monochrome only when the RGB bitmap image thereof indicates R=G=B and the attribute bitmap image indicates that printing of the pixel should be performed with only K; and converting with a conversion unit the RGB bitmap image obtained in the first-bitmap generating operation to the MCYK bitmap image based on a determination result obtained in the determination operation, MCY of a pixel of the MCYK bitmap image being 0 when the determination result for the pixel is monochrome.

5. An information processing method according to claim 4, wherein the attribute-bitmap image generated by the attribute-bitmap generating operation with the attribute-bitmap generating unit includes information as to whether each pixel represents a character, a figure, or an image, and information indicating whether printing of each pixel should be performed with only black or with color.

6. A computer-readable storage medium containing program code executable by a computer and instructing the computer to generate an MCYK bitmap image based on an input rendering command according to a method comprising:

generating intermediate data including information about a rendering object on a page based on the input rendering command;

generating an RGB bitmap image of the page based on the intermediate data obtained in the intermediate-data generating operation;

generating an attribute bitmap image including attribute information corresponding to each pixel forming the RGB bitmap image based on the intermediate data obtained in the intermediate-data generating operation, wherein the attribute bit map image indicates whether printing of each pixel should be performed with only K or with MCYK;

performing a color/monochrome determination for each pixel of the RGB bitmap image based on both the attribute bitmap image obtained in the attribute-bitmap generating operation and the RGB bitmap image obtained in the first-bitmap generating operation, the determination operation determining that a pixel is monochrome only when the RGB bitmap image thereof indicates R=G=B and the attribute bit map image indicates that printing of the pixel should be performed with only K; and convening the RGB bitmap image obtained in the first-bitmap generating operation to the MCYK bitmap image based on a determination result obtained in the determination operation, MCY of a pixel of the MCYK bitmap image being 0 when the determination result for the pixel is monochrome.

7. A computer readable storage medium according to claim 6, wherein the attribute-bitmap image generated by the attribute-bitmap generating operation includes information as to whether each pixel represents a character, a figure, or an image, and information indicating whether printing of each pixel should be performed with only black or with color.

* * * * *